US006731214B2

United States Patent
Kuo

(10) Patent No.: US 6,731,214 B2
(45) Date of Patent: May 4, 2004

(54) SEARCHING SYSTEM

(75) Inventor: Chunn-Cherh Kuo, Taipei (TW)

(73) Assignee: Lite-On Technology Corporation, Taipei (TW)

(*) Notice: Subject to any disclaimer, the term of this patent is extended or adjusted under 35 U.S.C. 154(b) by 27 days.

(21) Appl. No.: 10/183,533

(22) Filed: Jun. 28, 2002

(65) Prior Publication Data

US 2004/0000994 A1 Jan. 1, 2004

(51) Int. Cl.$^7$ .............................................. G08B 23/00
(52) U.S. Cl. .............................. 340/573.1; 340/573.4; 340/539.15
(58) Field of Search ........................ 340/573.1, 573.3, 340/573.4, 539.15, 995.1, 990; 701/213; 342/352, 357.01, 357.06, 357.07, 357.08, 357.09, 357.14

(56) References Cited

U.S. PATENT DOCUMENTS

| 5,731,757 A | * | 3/1998 | Layson, Jr. ............... 340/573.1 |
| 5,838,237 A | * | 11/1998 | Revell et al. ............ 340/573.1 |
| 5,949,350 A | * | 9/1999 | Girard et al. .......... 340/825.49 |
| 6,067,018 A | * | 5/2000 | Skelton et al. ........... 340/573.3 |
| 6,100,806 A | * | 8/2000 | Gaukel .................... 340/573.4 |

* cited by examiner

Primary Examiner—Nina Tong
(74) Attorney, Agent, or Firm—Rosenberg, Klein & Lee

(57) ABSTRACT

A searching system employs a global positioning system (GPS) and a wireless communication system to enable a second transceiver to trace the distance and the directions of a plurality of first transceivers. The first transceiver can automatically call the second transceiver user when the user of the first transceiver is at rest in excess of a predetermined interval or has a body temperature lower than a critical value. The user of the first transceiver can push an emergency button on the first transceiver to call the user of the second transceiver for help.

11 Claims, 3 Drawing Sheets

SEARCHING SYSTEM

FIELD OF THE INVENTION

The present invention relates to a searching system, especially to a searching system using a global positioning system (GPS) and a bi-directional wireless communication system to provide the function of position tracing.

BACKGROUND OF THE INVENTION

The global positioning systems (GPS) are extensively used for satellite navigation systems, vehicle navigation systems and satellite phones.

The satellite phones can be used to locate users and are suitable for finding stray people such as the children or the aged. However, the satellite phones should incorporate with base stations and the central console to achieve the above-mentioned goals.

Alternately, the stray people can call out through the satellite phones to respond his/her locations given the condition that the satellite phones are stand by always. However, this approach is not applicable to young children or the aged who are not capable of using the satellite phones. Further, if the stray people are accompanied with other crowds, the whole communication system may have the problem of congestion to undermine the communication quality of all phone calls.

Another approach to alarm parents for stray children is to place tracers on their children. The tracers detect the signal amplitudes and alarm the parents once their children are too far away. However, these tracers cannot locate the precise positions of the children and are not applicable to the condition with many crowds around either.

SUMMARY OF THE INVENTION

It is an object of the present invention to provide a searching system using a global positioning system (GPS) and a bi-directional wireless communication system (such as a Bluetooth system), whereby the second transceiver can have the information of distances and directions of a plurality of first transceivers. The first transceiver receives first GPS signals to calculate and return data of their positions to the second transceiver. The second transceiver also receives second GPS signals and calculates the data corresponding to the location thereof. Therefore, the second transceiver may recognize the relative positions of the first transceivers with respect to the second transceiver after having the location data for the first transceivers and itself.

It is another object of the present invention to provide a searching system, and wherein the first transceiver has an emergency button thereon and the user thereof can press the emergency button to call the user of the second transceiver for help.

It is still another object of the present invention to provide a searching system, and wherein the first transceiver has a motion sensor such that it can send an alarm to the user of the second transceiver when the user of the first transceiver is detected to be at rest for a predetermined interval.

It is still another object of the present invention to provide a searching system, and wherein the first transceiver has a temperature sensor such that it can send an alarm to the second transceiver when the user of the first transceiver is detected to have a temperature lower than a predetermined critical value.

It is still another object of the present invention to provide a searching system, and wherein the first and the second transceiver communicate through a Bluetooth system or other RF communication systems.

The various objects and advantages of the present invention will be more readily understood from the following detailed description when read in conjunction with the appended drawing, in which:

DETAILED DESCRIPTION OF THE INVENTION

Figure 1:
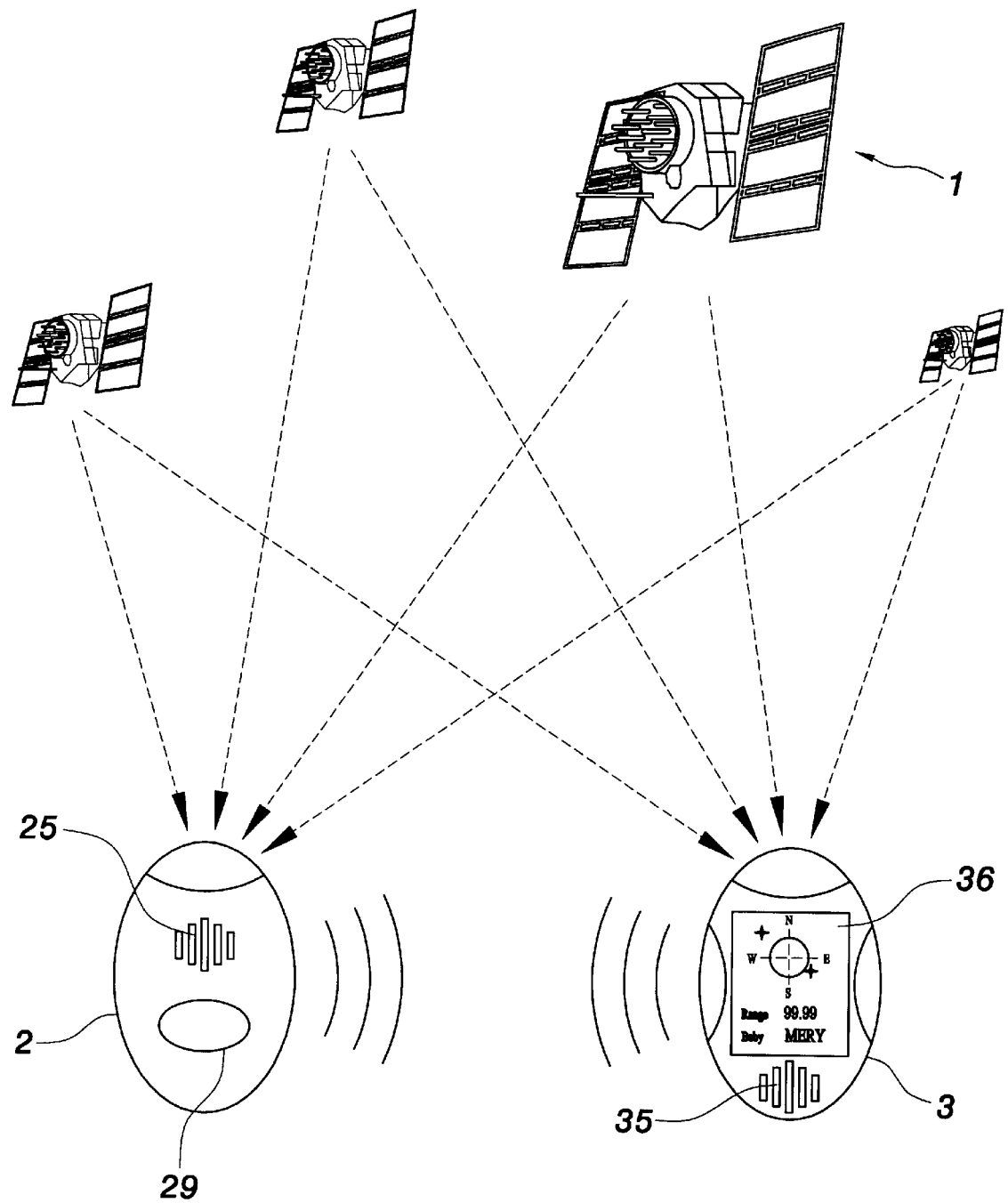
FIG. 1 shows a schematic diagram of the present invention.

FIG. 1 shows a schematic diagram of the present invention. The searching system of the present invention uses a global positioning system (GPS) and a Bluetooth communication system to enable a user of a second transceiver 3 to trace the users of a plurality of first transceivers 2. In the preferred embodiment of the present invention, the user of the second transceiver 3 is a mother and the user of the first transceiver 2 is her child.

When the first transceiver 2 receives first GPS signals, which are requested to send to the first transceiver 2 by the second transceiver 3, from positioning satellites 1, the first transceiver 2 calculates the first position thereof and sends the first position to the second transceiver 3 through a first wireless communication unit (not shown) such as a Bluetooth unit. The second transceiver 3 also receives second GPS signals from positioning satellites 1 and calculates the second position thereof. Therefore, the second transceiver 3 obtains the relative position of the first transceiver 2 with respect to the second transceiver 3 through a second wireless communication unit (not shown) and displays the relative position through a coordinated map (not shown either).

Figure 2:
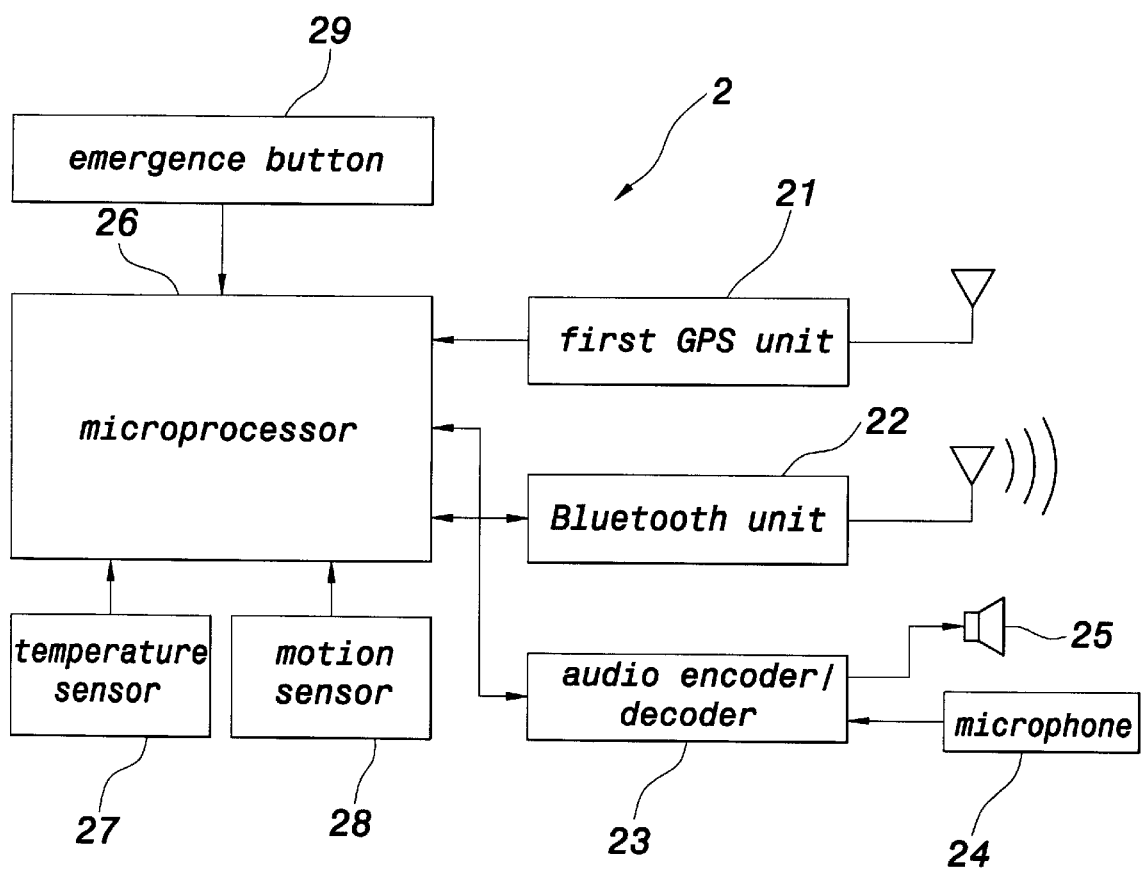
FIG. 2 shows the block diagram of the slave module according to the present invention.

FIG. 2 shows the block diagram of the first transceiver 2 according to the present invention. The first transceiver 2 includes a first GPS unit 21, a first communication unit, preferably a Bluetooth unit 22, an audio encoder/decoder 23, a microphone 24, a loudspeaker 25, a microprocessor 26, a temperature sensor 27 and a motion sensor 28.

The first GPS unit 21 receives first GPS signals from positioning satellites 1 to calculate the first position thereof.

The Bluetooth unit 22 is a low-power wireless communication unit and suitable for the short-distance communication. The Bluetooth unit 22 serves as a transmission medium between the first transceiver 2 and the second transceiver 3. The Bluetooth unit 22 can also be replaced by other RF communication units.

The audio encoder/decoder 23 has an input connected to the microphone 24 and an output connected to the loudspeaker 25. The audio encoder/decoder 23 serves as to convert a digital input signal into an analog signal, output the analog signal through the loudspeaker 25, or to convert an analog input signal input from the microphone 24 into a digital signal.

The microprocessor 26 is connected to the first GPS unit 21, the Bluetooth unit 22, and the audio encoder/decoder 23. The microprocessor 26 receives requests from the second transceiver 3 and sends the first position thereof calculated by the GPS unit 21 through the Bluetooth unit 22. The microprocessor 26 also receives a calling request from the second transceiver 3, and controls the audio encoder/decoder 23 to generate a calling sound through the loudspeaker 25.

The temperature sensor 27 is connected to the microprocessor 26 to sense the temperature of the user of the first transceiver 2. When the temperature of the user detected by the temperature sensor 27 is less than a predetermined critical temperature, the microprocessor 26 sends a warning signal to the user of the second transceiver 3.

The motion sensor 28 is connected to the microprocessor 26 to detect if the user of the first transceiver 2 moves or rests. When the user of the first transceiver 2 is at rest for a predetermined time interval, the microprocessor 26 sends another warning signal to the user of the second transceiver 3.

The first transceiver 2 has an emergency button 29 connected to the microprocessor 26. When the user of the first transceiver is in emergency and presses the emergency button 29, the microprocessor 26 sends another warning signal to the second transceiver 3.

Figure 3:
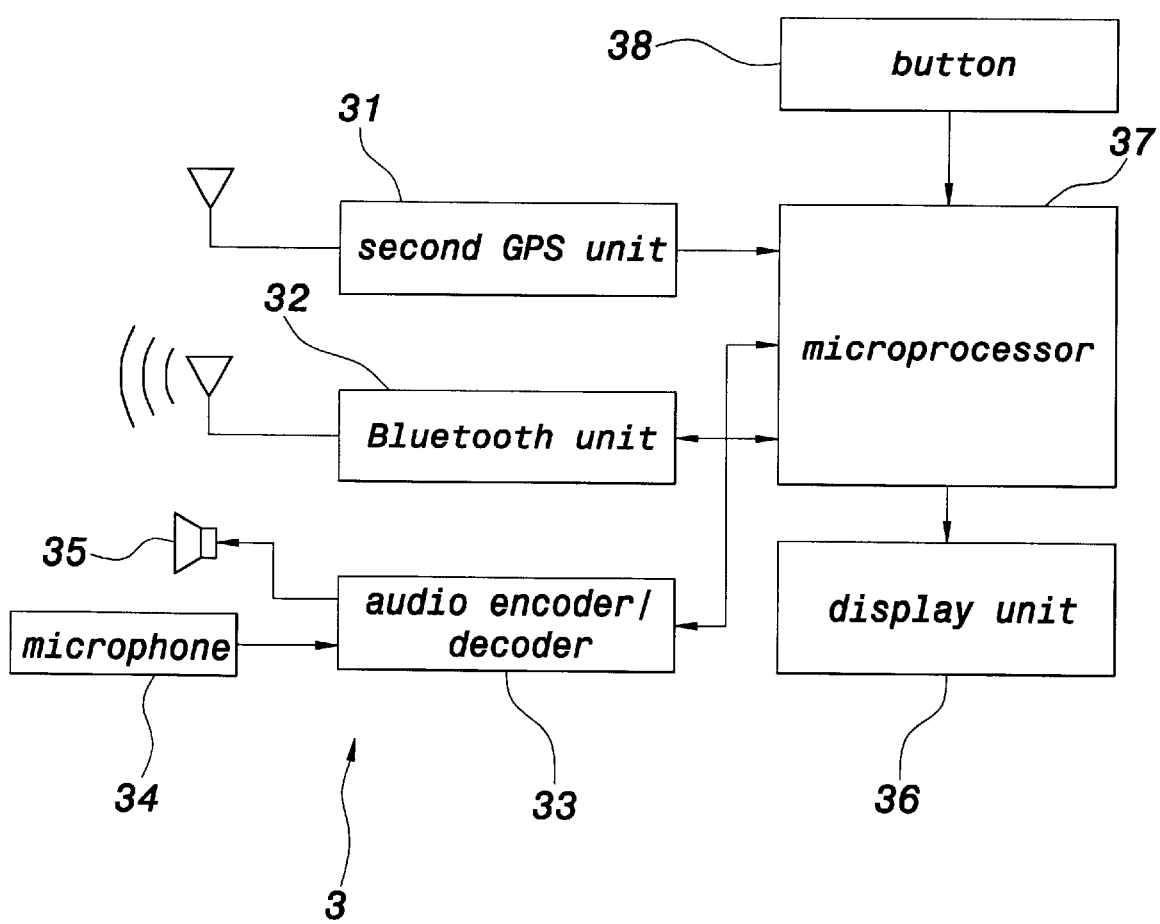
FIG. 3 shows the block diagram of the master module according to the present invention.

FIG. 3 shows the block diagram of the second transceiver 3. The second transceiver 3 according to the present invention includes a second GPS unit 31, a second wireless communication unit, preferably a Bluetooth unit 32, an audio encoder/decoder 33, a microphone 34, a loudspeaker 35, a display unit 36 and a microprocessor 37.

The second GPS unit 31 receives GPS signals from positioning satellites 1 to calculate the second position and obtains the returned first position, thereby achieving the relative position of the first transceiver 2 with respect to the second transceiver 3.

The Bluetooth unit 32 is a low-power wireless communication unit and suitable for the short-distance transmission. The Bluetooth unit 32 serves as a transmission medium between the first transceiver 2 and the second transceiver 3. The Bluetooth unit 32 can also be replaced by other RF communication units.

The audio encoder/decoder 33 has an input connected to the microphone 34 and an output connected to the loudspeaker 35. The audio encoder/decoder 23 serves as to convert a digital input signal into an analog signal, output the analog signal through the loudspeaker 35, or convert an analog input signal from the microphone 34 into a digital signal.

The display unit 36 can display information like name, the direction and the distance of the user of the first transceiver 2 on a coordinated map.

The microprocessor 37 is connected to the second GPS unit 31, the Bluetooth unit 32, the audio encoder/decoder 33, and the display unit 36. The microprocessor 37 calculates the position of the first transceiver 2 and displays the relative position on the display unit 36. The microprocessor 37 controls the audio encoder/decoder 33 for generating a warning signal through the loudspeaker 35 when the second transceiver 3 receives no response from the first transceiver 2. The microprocessor 37 can also send the calling sound to a specific user of the first transceiver 2 through the Bluetooth unit 32. The microprocessor 37 can also control the audio encoder/decoder 33 to generate a warning signal through the loudspeaker 35 to inform the user of the second transceiver 3 when the microprocessor 37 receives the same kind of warning signal from the first transceiver 2.

Moreover, the second transceiver 3 has a plurality of buttons 38 connected to the microprocessor 37. The buttons 38 serves to set different warning sounds and calling sounds for different users of the first transceiver 2 and different critical distances between the first and second transceivers. The critical distance here is to tell the second transceiver 3 how distant from the first transceiver 2. Moreover, the first transceiver 2 and the second transceiver 3 are switchable through setting one or some of the buttons 38 mentioned above. In other words, one first transceiver 2 can also be operated as a second transceiver 3 just by setting one or some of the buttons 38. The same rule is applicable given the condition that one second transceiver 3 is going to be operated as the first transceiver 2. Therefore a second transceiver 3 can be a relay transceiver between a first transceiver 2 and another second transceiver 3.

When one or both of the first transceiver 2 and the second transceiver 3 are in condition of weak GPS signals, the first transceiver 2 and the second transceiver 3 are switched to an operation mode that the signal amplitude between both transceivers is maintained to a minimum level to keep the communication therebetween still alive. Under this condition, both transceivers may dynamically adjust emitting powers thereof. And, according to the adjustable emitting powers, the second transceiver can trace the first transceiver with the least power consumption, and the distance between both transceivers can be figured out roughly.

To sum up, the searching system of the present invention has following advantages:

1. A second transceiver can simultaneously trace the directions and distances of a plurality of first transceivers through GPS and wireless communication units.
2. The user of the first transceiver can directly call the user of the second transceiver for help.
3. The user of the second transceiver can call a user of a specific first transceiver.
4. The user of the first transceiver can automatically inform the user of the second transceiver once the first transceivers is at rest for a predetermined interval.
5. The user of the first transceiver can automatically inform the user of the second transceiver once the temperature of the user is less than a predetermined critical temperature.
6. The possibility for using multiple second transceivers.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:
1. A searching system comprising:
a plurality of global positioning system (GPS) satellites;
at least one first transceiver for receiving a first GPS signal from the GPS satellites and returning a first position thereof through a first wireless communication unit;
at least one second transceiver for receiving a second GPS signal from the GPS satellites, calculating a second position thereof and the first position received through a second wireless communication unit so as to achieve a relative position of the first transceiver with respect to the second transceiver, and displaying the relative position through a coordinated map, said second transceiver comprising:

a second GPS unit for receiving the second GPS signal from the GPS satellites and calculating the second position of the second transceiver and the returned first position, thereby obtaining the relative position of the first transceiver with respect to the second transceiver;

an audio encoder/decoder having an input connected to a microphone and an output connected to a loudspeaker, the audio encoder/decoder converting a digital input signal into an analog signal, outputting the analog signal through the loudspeaker, and converting an analog input signal from the microphone into a digital signal;

a display unit for displaying a user's information of the first transceiver including the user's name, direction and distance on the coordinated map: and, a microprocessor connected to the second GPS unit, the second wireless communication unit, the audio encoder/decoder and the display unit, the microprocessor calculating the relative position of the first transceiver with respect to the second transceiver and displaying the relative position on the display unit, the microprocessor controlling the audio encoder/decoder to generate a warning sound when the microprocessor receives no response from the first transceiver, sending a calling sound to the first transceiver, and controlling the audio encoder/decoder for calling a user of the second transceiver as receiving a warning signal from the first transceiver.

2. The searching system as in claim 1, wherein the first transceiver sends a warning signal to the second transceiver when the first transceiver is at rest for a predetermined time interval, and then a user of the second transceiver is informed.

3. The searching system as in claim 1, wherein the first transceiver sends a warning signal to the second transceiver when the first transceiver senses a temperature is lower than a predetermined critical temperature, and a user of the second transceiver is informed.

4. The searching system as in claim 1, wherein the first and the second wireless communication units are selected from a group consisting of a Bluetooth unit and a RF unit.

5. The searching system as in claim 1, wherein the first transceiver has an emergency button for calling the second transceiver if in emergency.

6. The searching system as in claim 1, wherein the first transceiver comprises:

a first GPS unit for receiving the first GPS signal from the GPS satellites, calculating the first position of the first transceiver, and returning the first position to the second transceiver; and a microprocessor connected to the first GPS unit and the first wireless communication unit for receiving requests from the second transceiver and sending the first position to the second transceiver through the first wireless communication unit.

7. The searching system as in claim 6, wherein the first transceiver further comprises a temperature sensor connected to the microprocessor for detecting temperatures of a user of the first transceiver.

8. The searching system as in claim 6, wherein the first transceiver further comprises a motion sensor connected to the microprocessor for detecting if a user of the first transceiver moves or rests.

9. The searching system as in claim 6, wherein the first transceiver further comprises an audio encoder/decoder having an input connected to a microphone and an output connected to a loudspeaker, the audio encoder/decoder controlled by the microprocessor converting a digital input signal into an analog signal, outputting the analog signal through the loudspeaker, and converting the an analog input signal from the microphone into a digital signal.

10. The searching system as in claim 1, wherein the second transceiver has at least one button, which is used to set the different warning sounds and the calling sounds for different users of the first transceiver and for different critical distances between the first transceiver and the second transceiver.

11. A searching system comprising:

a plurality of global positioning system (GPS) satellites;

at least one first transceiver for receiving a first GPS signal from the GPS satellites and returning a first position thereof though a first wireless communication unit;

at least one second transceiver for receiving a second GPS signal from the GPS satellites, calculating a second position thereof and the first position received though a second wireless communication unit so as to achieve a relative position of the first transceiver with respect to the second transceiver, and displaying the relative position though a coordinated map, wherein the first transceiver and the second transceiver are switchable.

* * * * *